United States Patent
Van Deventer et al.

(10) Patent No.: US 9,463,873 B2
(45) Date of Patent: Oct. 11, 2016

(54) VEHICLE BRAKING SYSTEM HAVING BRAKING CONTROL AND SKID REDUCTION FUNCTIONS

(71) Applicant: The Boeing Company, Chicago, IL (US)

(72) Inventors: Bruce Van Deventer, Lynwood, WA (US); Erik L. Godo, Redmond, WA (US)

(73) Assignee: The Boeing Company, Chicago, IL (US)

( * ) Notice: Subject to any disclaimer, the term of this patent is extended or adjusted under 35 U.S.C. 154(b) by 148 days.

(21) Appl. No.: 14/329,952

(22) Filed: Jul. 13, 2014

(65) Prior Publication Data

US 2016/0009385 A1      Jan. 14, 2016

(51) Int. Cl.
| | |
|---|---|
| *B64C 25/46* | (2006.01) |
| *B60T 8/00* | (2006.01) |
| *B60T 8/1761* | (2006.01) |
| *B60T 8/1763* | (2006.01) |
| *B60T 8/173* | (2006.01) |
| *B60T 8/17* | (2006.01) |

(52) U.S. Cl.
CPC ............. *B64C 25/46* (2013.01); *B60T 8/00* (2013.01); *B60T 8/1703* (2013.01); *B60T 8/173* (2013.01); *B60T 8/17613* (2013.01); *B60T 8/17633* (2013.01); *B60T 8/17636* (2013.01)

(58) Field of Classification Search
CPC ....... B65C 25/46; B60T 8/00; B60T 8/1703; B60T 8/17613; B60T 8/173; B60T 8/17633; B60T 8/17636; G01P 15/165
USPC .......... 701/71; 303/149, 150, 154, 159, 175, 303/183, 195
See application file for complete search history.

(56) References Cited

U.S. PATENT DOCUMENTS

| | | | | |
|---|---|---|---|---|
| 3,614,174 A | | 10/1971 | Romero | |
| 3,856,365 A | * | 12/1974 | Steigerwald | B64C 25/426 244/111 |
| 3,863,993 A | * | 2/1975 | Fleischer | B60T 8/17633 303/159 |
| 3,880,475 A | * | 4/1975 | Booher | B64C 25/46 244/111 |
| 3,976,860 A | * | 8/1976 | Gerstenmeier | B60T 8/173 303/163 |
| 4,723,637 A | * | 2/1988 | Thompson, Sr. | B64C 25/46 188/181 T |
| 4,818,037 A | * | 4/1989 | McEnnan | B60T 8/171 303/183 |
| 5,141,294 A | * | 8/1992 | Van Zanten | B60T 8/17636 303/182 |
| 5,163,743 A | * | 11/1992 | Leppek | B60T 8/1764 303/113.5 |

(Continued)

FOREIGN PATENT DOCUMENTS

| | | |
|---|---|---|
| EP | 0936114 A2 | 8/1999 |
| WO | 9410014 A1 | 5/1994 |

OTHER PUBLICATIONS

Partial European Search Report in European Patent Application No. 15176535.1 (European counterpart of the instant U.S. patent application), dated Feb. 9, 2016.

(Continued)

*Primary Examiner* — Fadey Jabr
*Assistant Examiner* — Angelina Shudy
(74) *Attorney, Agent, or Firm* — Ostrager Chong Flaherty & Broitman P.C.

(57) ABSTRACT

Methods and means for reducing wear in electric or electro-hydraulic braking systems utilizing an adjustable (adaptive) filter, wherein the adaptive filter provides for rapid response during anti-skid operation and a smooth and filtered response during non-anti-skid operation.

24 Claims, 9 Drawing Sheets

(56) References Cited

U.S. PATENT DOCUMENTS

| | | | | |
|---|---|---|---|---|
| 5,390,990 | A * | 2/1995 | Cook | B60T 8/00 188/181 T |
| 5,551,769 | A * | 9/1996 | Luckevich | B60T 8/505 303/148 |
| 5,576,959 | A * | 11/1996 | Hrovat | B60T 8/172 180/197 |
| 5,707,118 | A * | 1/1998 | Kolberg | B60T 8/1703 303/126 |
| 5,775,785 | A * | 7/1998 | Harris | B60T 8/17616 303/156 |
| 6,012,010 | A * | 1/2000 | Batistic | B60T 8/1755 303/186 |
| 6,036,285 | A * | 3/2000 | Murphy | B60T 8/17616 188/181 T |
| 6,178,370 | B1 * | 1/2001 | Zierolf | B60T 8/1703 188/181 A |
| 6,220,676 | B1 * | 4/2001 | Rudd, III | B60T 8/1703 188/181 T |
| 6,282,469 | B1 * | 8/2001 | Rogers | B60R 16/0231 701/31.4 |
| 6,612,662 | B2 * | 9/2003 | Ohtsu | B60T 8/17616 303/156 |
| 6,659,400 | B2 * | 12/2003 | Park | B64C 25/46 244/111 |
| 6,882,920 | B2 * | 4/2005 | Rudd, III | B60T 8/1703 303/155 |
| 6,928,355 | B2 * | 8/2005 | Nihei | B60T 8/1764 701/70 |
| 7,509,204 | B2 * | 3/2009 | Phillips | B60T 8/17616 303/155 |
| 7,618,100 | B2 | 11/2009 | Griffith et al. | |
| 7,946,594 | B2 * | 5/2011 | Tan | B23B 31/123 279/140 |
| 8,290,676 | B2 * | 10/2012 | Thibault | B60T 7/12 180/370 |
| 8,573,709 | B2 * | 11/2013 | Suzuki | B60L 3/108 303/151 |
| 8,668,279 | B2 | 3/2014 | Van Deventer | |
| 9,002,609 | B2 * | 4/2015 | Nakamura | B60T 1/10 180/271 |
| 2002/0135229 | A1 * | 9/2002 | Ohtsu | B60T 8/17616 303/156 |
| 2003/0025035 | A1 * | 2/2003 | Park | B64C 25/46 244/111 |
| 2003/0120413 | A1 * | 6/2003 | Park | B60T 8/1703 701/71 |
| 2003/0182044 | A1 * | 9/2003 | Nakamura | B60T 8/00 701/70 |
| 2004/0140715 | A1 * | 7/2004 | Park | B60T 8/1703 303/126 |
| 2004/0232762 | A1 * | 11/2004 | Maron | B60T 13/74 303/20 |
| 2006/0009958 | A1 * | 1/2006 | Orth | G05B 9/03 703/13 |
| 2006/0220731 | A1 * | 10/2006 | Taylor | G05F 3/205 327/543 |
| 2008/0021624 | A1 * | 1/2008 | Maron | B60T 13/741 701/70 |
| 2008/0142318 | A1 * | 6/2008 | Griffith | B60T 8/1703 188/158 |
| 2008/0249675 | A1 * | 10/2008 | Goodman | B64C 25/426 701/16 |
| 2009/0024290 | A1 * | 1/2009 | Thibault | B60T 7/12 701/70 |
| 2010/0082267 | A1 * | 4/2010 | Schimert | G05B 19/4065 702/34 |
| 2010/0185376 | A1 * | 7/2010 | Onfroy | B60T 8/1703 701/70 |
| 2015/0254990 | A1 * | 9/2015 | Raby | G08G 5/0086 701/16 |
| 2016/0016660 | A1 * | 1/2016 | Ayichew | B60T 8/1703 701/3 |
| 2016/0020928 | A1 * | 1/2016 | Ayichew | B64C 25/42 701/70 |

OTHER PUBLICATIONS

Extended European Search Report in European Patent Application No. 15176535.1 (European counterpart of the instant U.S. patent application), dated Jun. 10, 2016.

* cited by examiner

VEHICLE BRAKING SYSTEM HAVING BRAKING CONTROL AND SKID REDUCTION FUNCTIONS

BACKGROUND

This disclosure generally relates to systems and methods for braking a wheel of a vehicle. More specifically, this disclosure relates to systems and methods for braking a wheel of an aircraft.

A vehicle braking system typically combines both a braking control function to apply brakes and a skid reduction system, herein referred to as an "anti-skid system". The braking control function includes the operator (hereafter referred to as the "pilot") input, along with inputs from an automatic wheel-based brake control system, generically referred to as the "autobrake". Many other braking control input functions can exist in both driven wheel systems such as automobiles and in non-driven wheel vehicles such as aircraft. These control inputs are characterized by smooth and uniform application and release. Noise on these inputs is detrimental to the long-term reliability of electric (electro-mechanical) and electro-hydraulic braking systems (the latter defined as a braking system where the clamping force in the brake is developed via hydraulic pressure, but the hydraulic pressure is generated by an electric motor, usually dedicated to the control function), due to excessive wear. An anti-skid system, on the other hand, is characterized by a rapid input to release a brake at the onset of a skid, and a continuing rapid response to control the deceleration of wheel speed in order to provide the optimal braking performance. Hence the anti-skid input to a braking control system is characterized by a rapid response. These two characteristics are in conflict.

The prior art design simply merges the brake pedal (and all other mode) commands in along with the anti-skid command, resulting in a braking signal input which needs to accomplish both goals. This design may result in excessive wear in the electric-mechanical or electro-hydraulic braking system.

SUMMARY

The subject matter disclosed herein is directed to methods and means for braking which provide reduced wear in electric or electro-hydraulic braking systems. The braking control systems disclosed in detail below have a rapid response capability for anti-skid performance and also smoothed, low-noise and low-wear performance for other braking functions (such as "pedal braking".) More specifically, the proposed braking control systems have an enhanced feature which can be thought of as a "filter", embodied in either a software or hardware implementation, in which the anti-skid command content is input directly into the brake actuator controller but other inputs are smoothed and filtered, and the transition between non-anti-skid operation and anti-skid operation is done in a smoothed fashion. In accordance with some embodiments, an anti-skid control input is used directly as an input to an adaptive filter having variable filter coefficients, which then smoothly transitions control from a filtered mode to a non-filtered, anti-skid mode. An alternative approach is adopted in a specific case wherein a time signature of the input signal in a non-anti-skid mode is used to infer the lack of anti-skid control content, but when this signature is absent, anti-skid control is assumed and the brake response transitions directly to a fast response mode.

One aspect of the subject matter disclosed in detail below is a method for braking comprising: (a) receiving a sequence of unfiltered braking command values comprising merged brake command values and anti-skid command values; (b) adaptively filtering the sequence of braking command values to form filtered braking command values; and (c) controlling a brake in accordance with the adaptively filtered braking command values, wherein the adaptive filtering changes from a first mode to a second mode in response to the content of anti-skid command values exceeding a specified threshold. In some implementations, the first mode is a slow response mode and the second mode is a pass-through mode or fast response mode. The brake command values may be computed based on brake pedal commands or autobrake commands.

In accordance with some embodiments, the adaptive filtering step comprises: selecting a first set of filter coefficients in response to a transition in the sequence of braking command values from predominantly brake command values to predominantly anti-skid command values; configuring a filter with the first set of selected filter coefficients; and filtering subsequently received braking command values using the filter configured with the first set of selected filter coefficients. The adaptive filtering step may further comprise: determining a signature of braking command values of the sequence received within a time window; and determining whether the signature is indicative of the transition. In one implementation, the signature comprises a number of matched pairs of braking command values of the sequence received within the time window, and the step of determining whether the signature is indicative of the transition comprises determining whether the number of matched pairs of braking command values is less than a specified threshold. The adaptive filtering step may further comprise: selecting a second set of filter coefficients in response to a transition in the sequence of braking command values from predominantly anti-skid command values to predominantly brake command values; configuring the filter with the second set of selected filter coefficients; and filtering subsequently received braking command values using the filter configured with the second set of selected filter coefficients. In accordance with a further refinement, the filter is in a fast response mode when configured with the first set of selected filter coefficients and in a slow response mode when configured with the second set of current filter coefficients, and a rate of transition from the slow response mode to the fast response mode is greater than a rate of transition from the fast response mode to the slow response mode. Alternatively or additionally, the filtering using the first set of selected filter coefficients and the filtering using the second set of selected filter coefficients are performed at respective predetermined time intervals subsequent to the transition, the respective predetermined time intervals being selected to ensure a smooth transition from a slow response filter mode to a fast response filter mode.

In accordance with other embodiments, the adaptive filtering step comprises: determining a signature of braking command values of the sequence received within a time window; determining whether the signature is indicative of a transition in the sequence of braking command values from predominantly brake command values to brake command values less than a specified threshold; and filtering subsequently received braking command values using a filter when the signature is not indicative of the transition and passing through the subsequently received braking command values without filtering when the signature is indicative of the transition. In one implementation, the signature comprises a number of matched pairs of braking command values of the sequence received within the time window, and the step of determining whether the signature is indicative of the transition comprises determining whether the number of matched pairs of braking command values is less than a specified threshold.

Another aspect of the subject matter disclosed in detail below is a method for braking comprising: (a) receiving a sequence of unfiltered braking command values comprising merged brake command values and anti-skid command values; (b) determining a signature of braking command values of the sequence received within a time window; (c) filtering received unfiltered braking command values to form filtered braking command values; (d) forming a weighted sum of the filtered and unfiltered braking command values using weighting factors which are a function of the signature; and (e) controlling a brake in accordance with the weighted sum. In one implementation, the signature comprises a number of matched pairs of braking command values of the sequence received within the time window, and the step of determining whether the signature is indicative of the transition comprises determining whether the number of matched pairs of braking command values is less than a specified threshold.

A further aspect of the subject matter disclosed herein is a method for braking comprising: (a) receiving a sequence of unfiltered braking command values comprising merged brake command values and anti-skid command values; (b) receiving a signal indicative of a transition from a brake command mode to an anti-skid command mode; (c) adaptively filtering the sequence of braking command values to form filtered braking command values; and (d) controlling a brake in accordance with the adaptively filtered braking command values, wherein the adaptive filtering gradually changes modes from a first mode to a second mode over time in response to receipt of the signal indicative of a transition from a brake command mode to an anti-skid command mode. In one implementation, the first mode is a slow response mode and the second mode is a pass-through mode.

Yet another aspect of the subject matter disclosed below is a braking system comprising: a brake arranged for braking a wheel; an actuator controller coupled to the brake; a braking command source of braking command values comprising merged brake command values and anti-skid command values; adaptive filtering means for adaptively filtering the sequence of braking command values, the adaptive filtering means having an input coupled to the braking command source and an output coupled to the actuator controller, wherein the adaptive filtering means changes modes from a slow response mode to a different mode in response to the content of anti-skid command values exceeding a specified threshold. The different mode can be a pass-through mode or a fast response mode.

In accordance with some embodiments, the adaptive filtering means comprise a filter and an adaptation algorithm each connected to receive the sequence of braking command values, wherein the adaptation algorithm reconfigures the filter in response to the content of anti-skid command values in the sequence of braking command values exceeding the specified threshold.

In accordance with other embodiments, the adaptive filtering means comprise a filter connected to receive the sequence of braking command values, means for forming a weighted sum of the input to and output from the filter, and an adaptation algorithm connected to receive an anti-skid command, wherein the adaptation algorithm determines weighting factors to be applied by the means for forming a weighted sum in response to the content of anti-skid command values in the sequence of braking command values exceeding the specified threshold.

In accordance with further embodiments, the braking system further comprises means for communicating a signal indicative of a transition from a brake command mode to an anti-skid command mode, wherein the adaptive filtering means has a first input coupled to the means for communicating a signal, a second input coupled to the braking command source, and an output coupled to the actuator controller, and the adaptive filtering means gradually changes modes from the slow response mode to a different mode over time in response to the signal indicative of a transition from a brake command mode to an anti-skid command mode. In some implementations, the different mode is a pass-through mode.

Other aspects of methods and means for reducing wear in electric and electro-hydraulic braking systems utilizing a digital filter with adjustable coefficients to produce optimal frequency response are disclosed and claimed below.

BRIEF DESCRIPTION OF THE DRAWINGS

Reference will hereinafter be made to the drawings in which similar elements in different drawings bear the same reference numerals.

DETAILED DESCRIPTION

The following detailed description is illustrative in nature and not intended to limit claim coverage to the disclosed embodiments or to the disclosed applications and uses of the disclosed embodiments.

Braking systems have existed as long as there have been wheeled vehicles, but it was not until the advent of anti-lock brake mechanisms, and later anti-skid control mechanisms or systems, that high-speed brake control response has been called for. An anti-lock system merely detects the rapid reduction of wheel speed from some elevated speed to zero (hence wheel lock) and provides brake release to allow the wheel to return to a spinning condition, thus regaining vehicle control. In contrast, an anti-skid system detects the onset of skidding of the wheel but attempts to provide a controlled "slip" of the wheel relative to the speed over ground, such that an optimal effective coefficient of friction is obtained. Aircraft anti-skid systems, which are relieved of the complexity of driven wheels in motor vehicles, can achieve quite high "efficiencies", meaning the ratio of the effectively developed coefficient of friction to a theoretical maximum coefficient of friction that could be obtained for that wheel on the same surface. Doing this requires rapid control of the brake.

In a modern brake-by-wire system, the non-anti-skid brake command input (such as from the pedal brake) will typically be digitally sampled and processed. Such sampling will have limited precision and will contain some measurement noise. Furthermore, the optimum speed to perform the control of the pedal brake input will be fairly low, consistent with the intent to create a smooth and jerk-free application of braking. However, this desire is in conflict with the need of the anti-skid system to provide nearly instantaneous response to the anti-skid release command. Furthermore, in a system utilizing electro-mechanical or electro-hydraulic brake actuators, there can be considerable mechanical motion of motors and gears required for a small input change, since a very large brake clamping force is often required.

Figure 1:
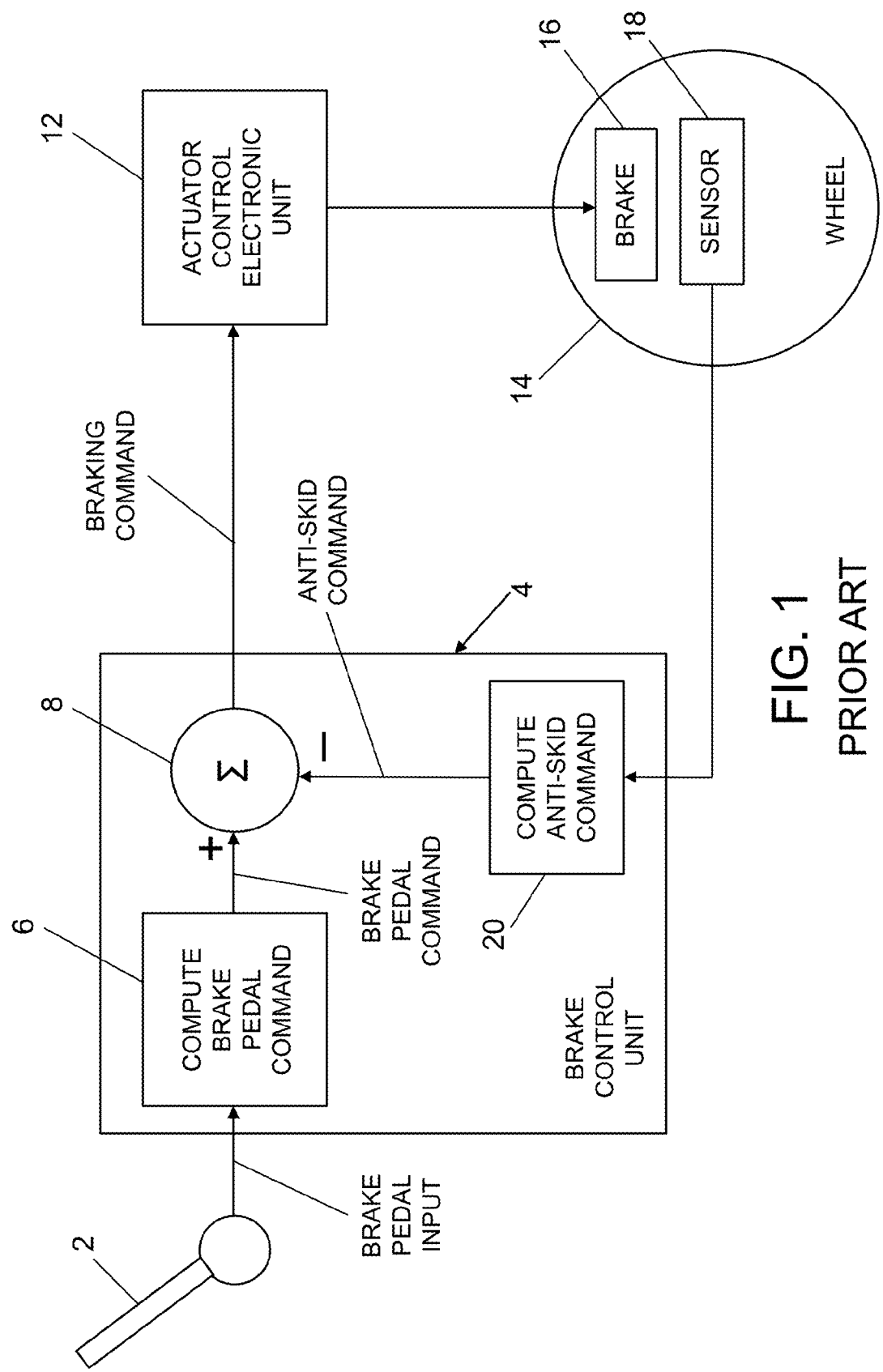
FIG. 1 is a block diagram showing components of a prior art wheel braking control system.

FIG. 1 is a block diagram showing components of a prior art wheel braking control system of the type wherein brake pedal or autobrake commands are merged with anti-skid commands. In the example shown in FIG. 1, the operator (e.g., a pilot) operates a brake pedal 2 to produce a brake pedal input which is sent to a brake pedal command computation block or module 6 incorporated in a brake control unit 4. The brake control unit 4 outputs a braking command to an actuator control electronic unit 12 (hereinafter "actuator controller 12"), which in turn powers and controls an electric or electro-hydraulic brake 16, which is capable of braking a wheel 14. The actuator controller 12 typically comprises motor control circuitry, and the brake 16 typically comprises one or more electric-motor-driven actuators or motor-driven hydraulic actuators (hereinafter "brake actuators"). Wheel speed is sensed by a sensor 18, which may also include electronics for calculating an anti-skid command, or alternatively, the anti-skid command (the release command) may be calculated in an anti-skid command computation block or module 20 in the brake control unit 4. Similarly brake pedal commands may be calculated in the brake pedal command computation block or module 6, which computations may be performed at a slower rate than the anti-skid command computations. The brake pedal command computation block or module 6 takes the pilot pedal input and converts it into a command to the actuator control 12. This converts the pedal input sensor to a numeric value and then may or may not add modifications to that numeric value based upon other inputs to the system, not shown.

As shown in FIG. 1, the anti-skid command represents a subtractive input (a release) relative to the brake pedal command input, that is, the negative of the anti-skid command value is added to the brake pedal command value in the summing junction 8. Note further that the brake pedal command could in the alternative be an automatic brake command, e.g., a brake control to a target deceleration value, referred to in the aircraft industry as autobrake, or a brake command intended to slow a vehicle to a desired turn-out point (e.g., a taxiway), referred to in the aircraft industry as "brake to vacate."

The methods for enhanced adaptive filtering disclosed in detail below are particularly suited for use in brake control systems in which the brake pedal command computation is several times slower than the anti-skid command computation.

Figure 2:
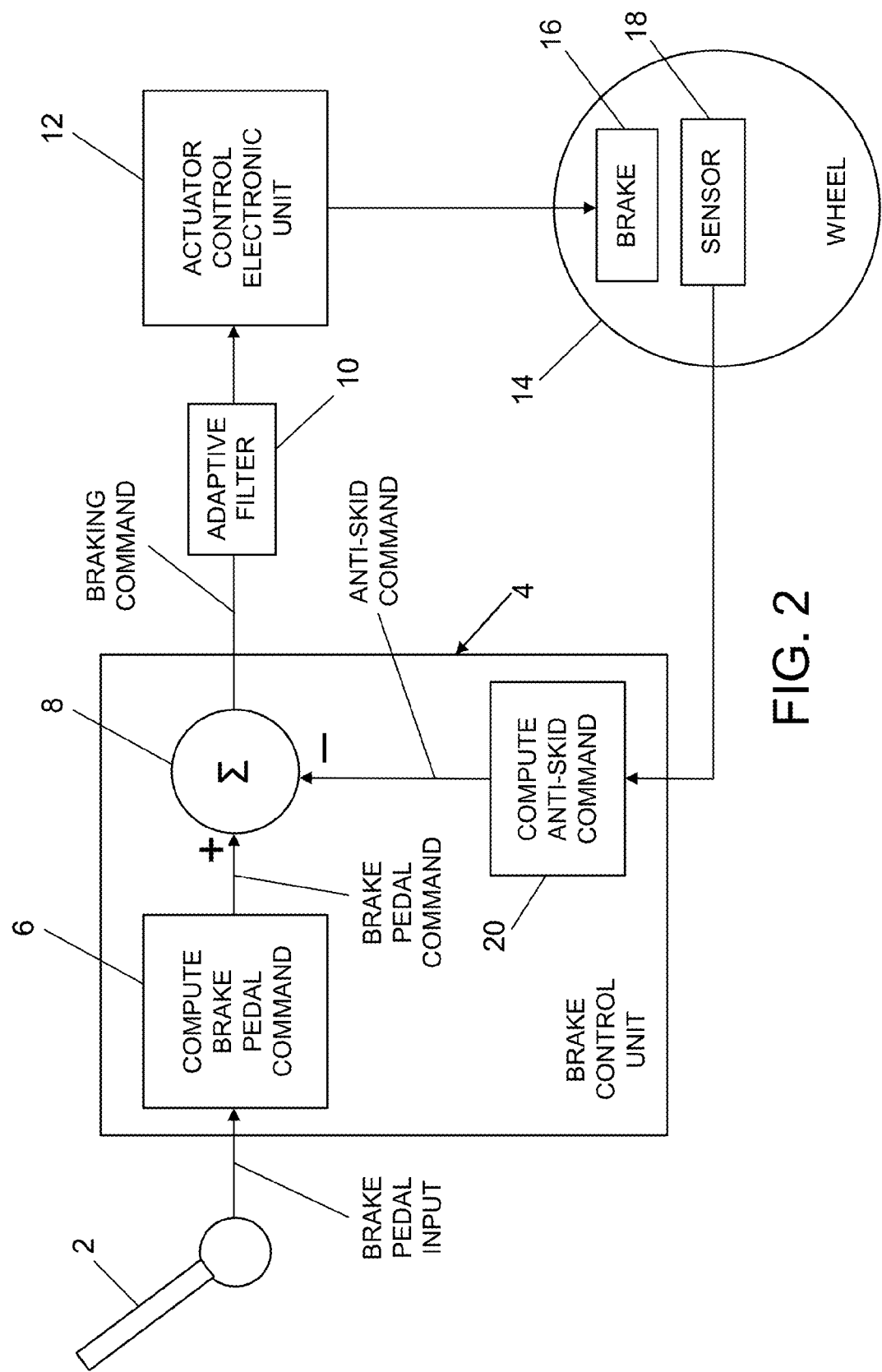
FIG. 2 is a block diagram showing components of an improved wheel braking control system having an adaptive filter for filtering braking commands.

FIG. 2 is a block diagram showing components of an improved wheel braking control system having an adaptive filter 10 for filtering braking commands. The adaptive filter 10 is not needed in the case where a digital filter could be inserted between the anti-skid command computation block or module 20 and the summing junction 8, but the adaptive filter 10 is useful when placing a digital filter between the anti-skid command computation block or module 20 and the summing junction 8 is not possible. FIG. 2 shows the adaptive filter 10 as being disposed between the brake control unit 4 and the actuator control electronic unit 12. However, in alternative implementations, the adaptive filter 10 may be disposed inside the brake control unit 4 or inside the actuator control electronic unit 12. Various embodiments of the adaptive filter 10 will be described below.

In the case where the brake pedal command computation 6 is significantly slower than the anti-skid command computation 20 (see FIG. 1), the digital sequence of commands being presented to the actuator controller 12 will normally comprise repeating series of identical values when there is no anti-skid command present, which is a normal condition in most vehicle operations. This condition is furthermore exacerbated when the measurement precision in the input is limited, or when there is noise present on the input, which is inevitable. The result is a command which appears to "dither" about a central value as opposed to an idealized constant value. Therefore, the actuator controller 12 would be presented with a command whose spectral content contains undesirable high frequencies, leading to extra motion of the brake actuators and potentially extra power consumption and premature wear.

Figure 3:
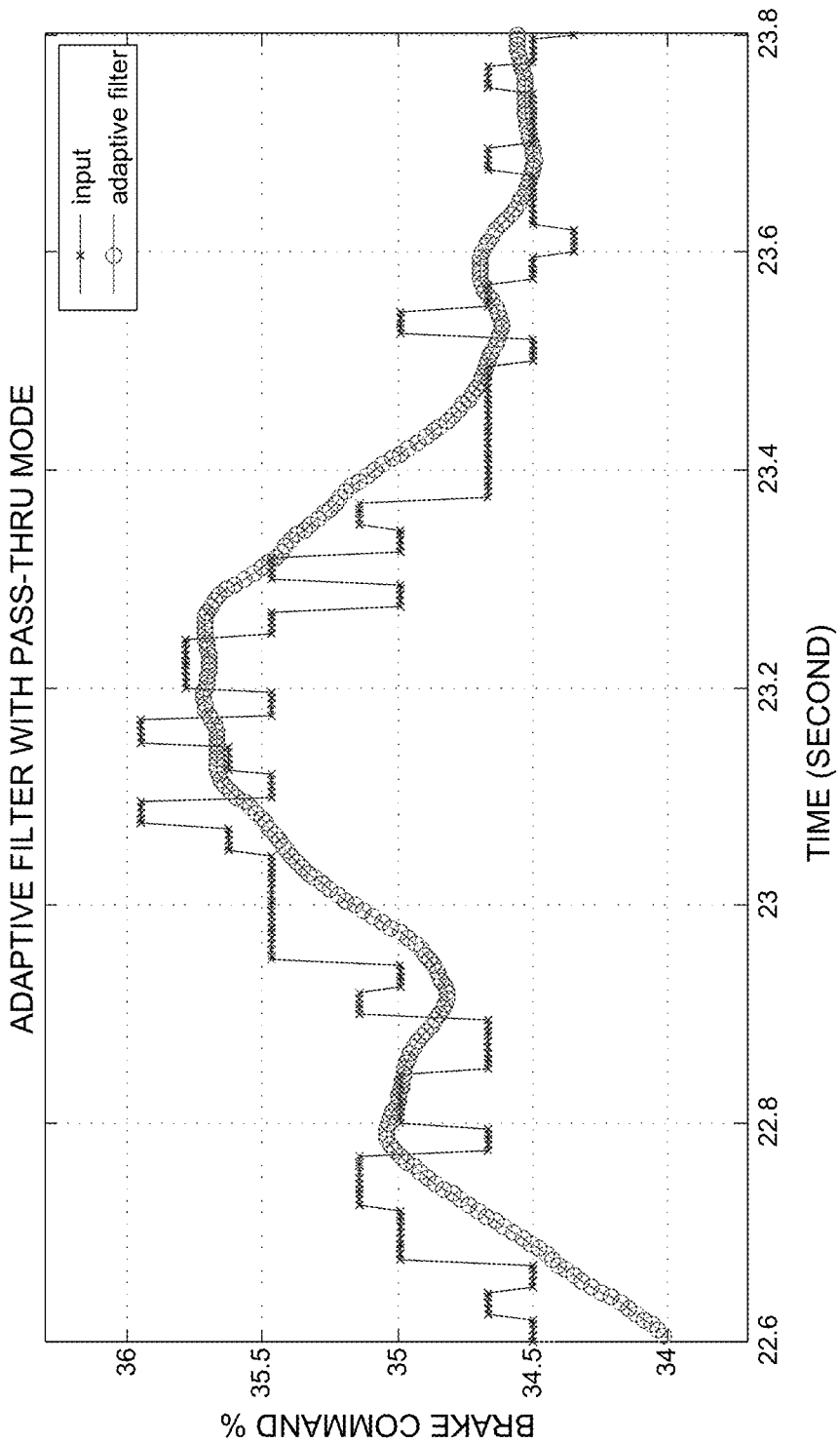
FIG. 3 is a graph of brake command (%) versus time (seconds) for an adaptive filter with pass-through mode. The x's represent the input to the adaptive filter; the circles represent the output of the adaptive filter.

FIG. 3 shows a slow filter response for a real system implemented using a five-millisecond anti-skid control loop, but a 25-millisecond loop for pedal and autobrake computation. The anti-skid computation is performed every five milliseconds. In the command sequence sample shown in FIG. 3, a pilot input (shown as a series of x's) is slowly varying, and the resulting output of the adaptive filter to the actuator controller is the series of circles in FIG. 3. As evidenced by the smooth chain of circles, the adaptive filter provides a slow-response filtered output.

Figure 4:
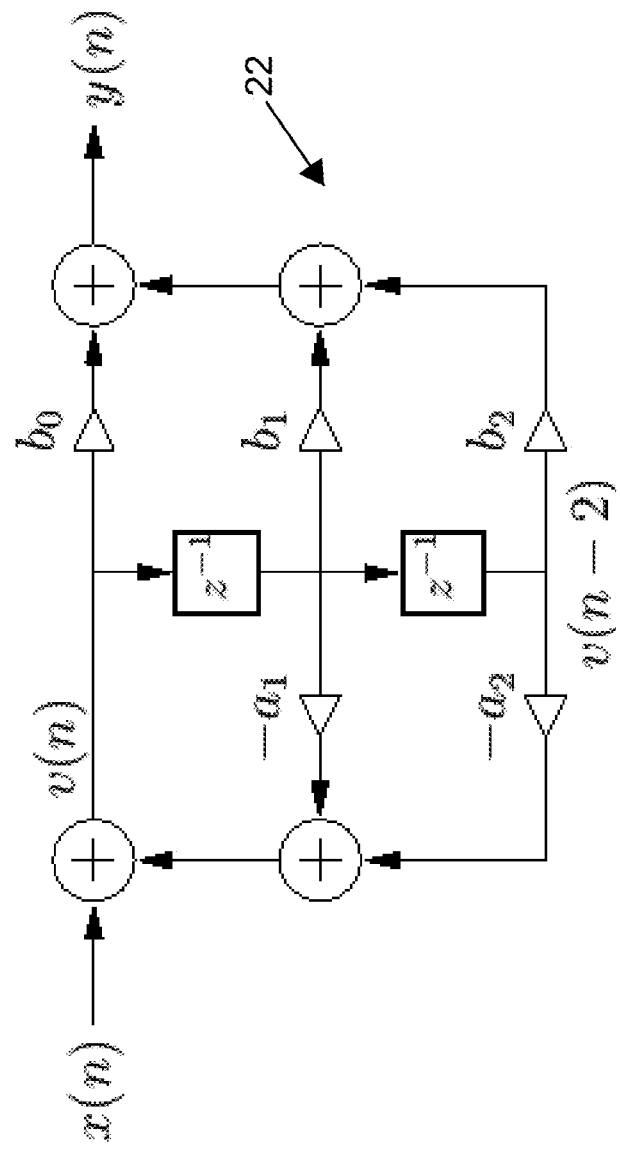
FIG. 4 is a block diagram showing the topology of a Direct Form II Infinite Impulse Response low-pass filter.

The filter used to provide the filtered output shown in FIG. 3 is well known in the art. In this case it is a digital Direct Form II Infinite Impulse Response low-pass filter having a slow response mode at 4 Hz and a fast response mode at 40 Hz. The topology for this type of digital filter is well known in the art and is shown in FIG. 4. The filter coefficients $b_0$, $b_1$, and $b_2$ are often constants in the canonical design, but the filter coefficients $a_1$ and $a_2$, which represent the pole pair, set the frequency response. The term $z^{-1}$ in FIG. 4 represents a unit delay.

Figure 5:
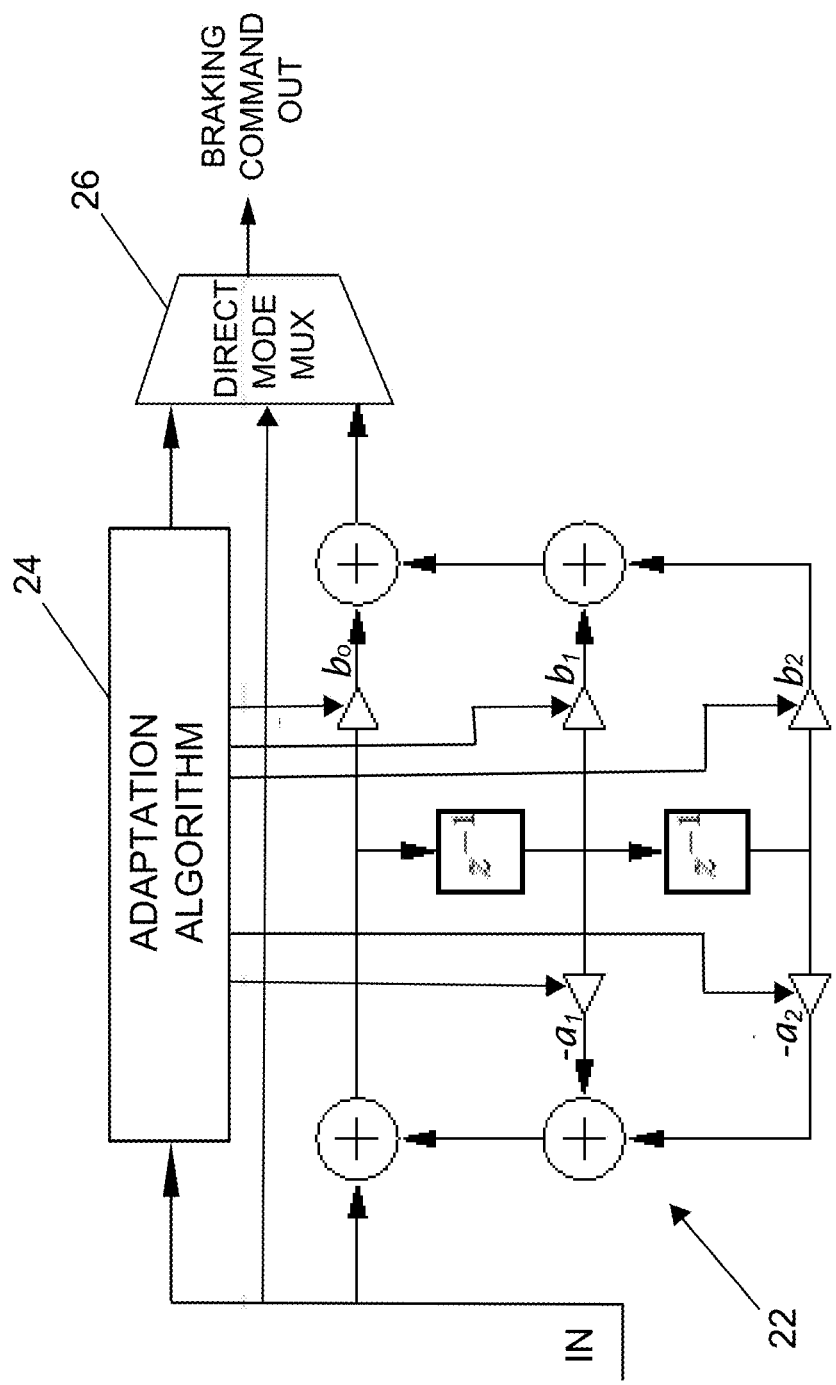
FIG. 5 is a block diagram showing an adaptive digital filter in accordance with one embodiment.

FIG. 5 is a block diagram showing an adaptive filter 10 in accordance with one embodiment. This adaptive filter 10 comprises a digital Direct Form II Infinite Impulse Response low-pass filter 22 (hereinafter "digital filter 22"), an adaptation algorithm 24, and a multiplexer 26. A sequence of samples of unfiltered braking command values is input concurrently to digital filter 22, to adaptation algorithm 24, and to multiplexer 26. The mode of multiplexer 26 is controlled by an output from the adaptation algorithm 24. The multiplexer 26 also receives filtered braking command values from the digital filter 22.

The digital filter 22 filters the incoming braking command value samples in accordance with filter coefficients received from the adaptation algorithm 24. The transmission of filter coefficients $a_1$, $a_2$, $b_0$, $b_1$, and $b_2$ from the adaptation algorithm 24 to the digital filter 22 is indicated by respective downwardly pointing arrows. It is also possible to only adjust the $a_1$ and $a_2$ terms (which set the pole location in the z plane) while leaving the $b_0$, $b_1$, and $b_2$ terms (which are typically constants) unchanged. The adaptation algorithm 24 measures the number of matched pairs of braking command values within a brief time window of previous samples, and then uses that number of matched pairs to adjust the filter coefficients to speed up or slow down the digital filter 22. When the window contains many sets of repeated pairs (or a small number of changes in value), then the filter coefficients represent a slow-response filter. As the number of matched pairs in the time window decreases, the filter coefficients are adjusted to speed up the filter response. Below a certain threshold, anti-skid operation is inferred, and the adaptation algorithm 24 sends a signal to the multiplexer 26 which places the latter in a direct mode whereby multiplexer 26 outputs the unfiltered braking command values rather than the filtered braking command values from digital filter 22, which has the effect that the unfiltered braking command values bypass the digital filter 22 and are output to the actuator controller (not shown in FIG. 5) by multiplexer 26 directly with no filtering. Additionally, the adaptation algorithm 24 will pass through unfiltered a zero braking command, which is identical to a full release anti-skid command.

The adaptation algorithm and the filtering function may be implemented using a computer system comprising separate processors or computers or by the same processor or computer programmed with suitable software. The digital filter may comprise an analog-to-digital converter to sample the input signal, followed by a microprocessor and some peripheral components such as memory to store data and filter coefficients, and finally a digital-to-analog converter to complete the output stage. Program instructions (software) running on the microprocessor implement the digital filter by performing the necessary mathematical operations on the digital values. In alternative embodiments, a field-programmable gate array, an application-specific integrated circuit, or a digital signal processor can be used instead of a general-purpose microprocessor. In the alternative, the filter may be implemented in hardware. For example, the adaptive filter may comprise an adaptation algorithm which controls the state of a switch which feeds the unfiltered braking commands into either of two filtering circuits having slow and fast responses respectively. Many other filter hardware implementations are possible.

The digital filter 22 shown in FIG. 5 can have one of many well-known digital filter topologies, and the brake control methodology disclosed herein can be utilized in many other digital filter topologies well known in the art, including filters of higher order.

In accordance with one embodiment, the pole pair adjustment can be performed using a look-up table of filter coefficients, wherein the look-up is based on the number of matched pairs of braking command values in a sample window. In accordance with one implementation, the adaptation algorithm 24 comprises matched pair counting in a time window of the previous twenty samples, and the responses of the digital filter 22 in the look-up table vary from 4 to 50 Hz, and are ordered so that when a small number of matched pair values exist, the frequency response is fast, but if there is a large number of matched pair values, the frequency response is slower. The slow response reduces brake actuator wear by removing useless motion.

The filter adaptation disclosed above smoothens the otherwise abrupt transition which would occur if there were a slow-response filter (which by its nature has a lagging output) or no filter.

The adaptation algorithm 24 is preferably implemented by examining the number of matched pairs of value in a time window of previous samples. The count of matched pairs, relative to the window length, is a prediction of the relative content of the anti-skid command in relationship to the content of the slow-loop generated pedal command. It is thus used to determine the extent to which the filter should have a fast response or slow response (or switch to a pass-through mode).

Figure 6:
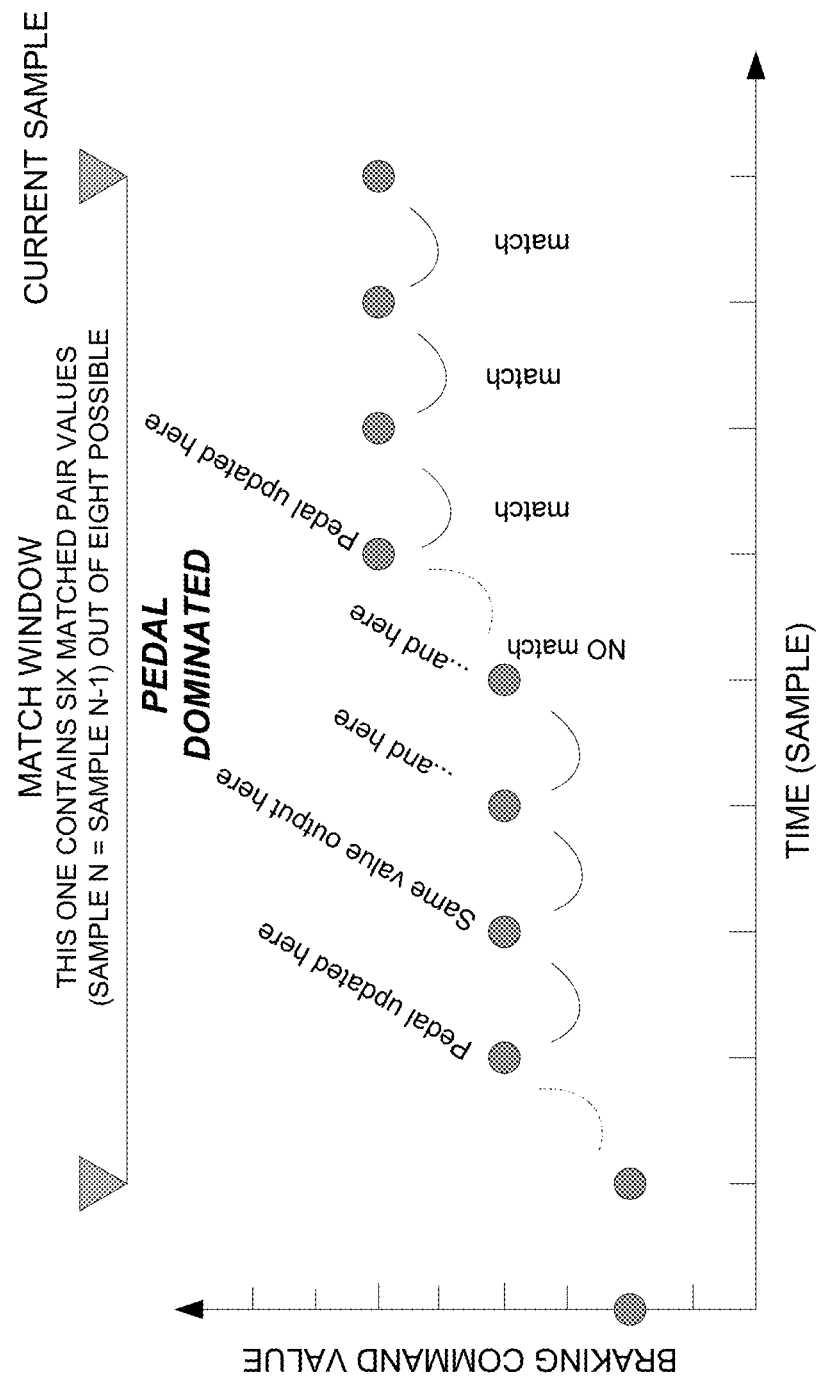
FIG. 6 is a graph showing the processing of a sequence of command value samples by a matched pair algorithm for predicting the system operating mode. In the example depicted in FIG. 6, the commands sampled during a time window are predominantly brake pedal commands.

FIG. 6 is a graph showing the processing of a sequence of command value samples by a matched pair algorithm for predicting the system operating mode. In the example depicted in FIG. 6, the commands sampled during a time window are predominantly brake pedal commands, so that the system should be operated in a slow-response pedal braking mode. That the slow-response pedal braking mode should be operative is detected by the adaptation algorithm since the time window has a high number (i.e., six out of eight possible) of matched pairs, representing duplicate values output by the brake control unit. In this case, the frequency coefficients in the digital filter should be adjusted for slow response.

Figure 7:
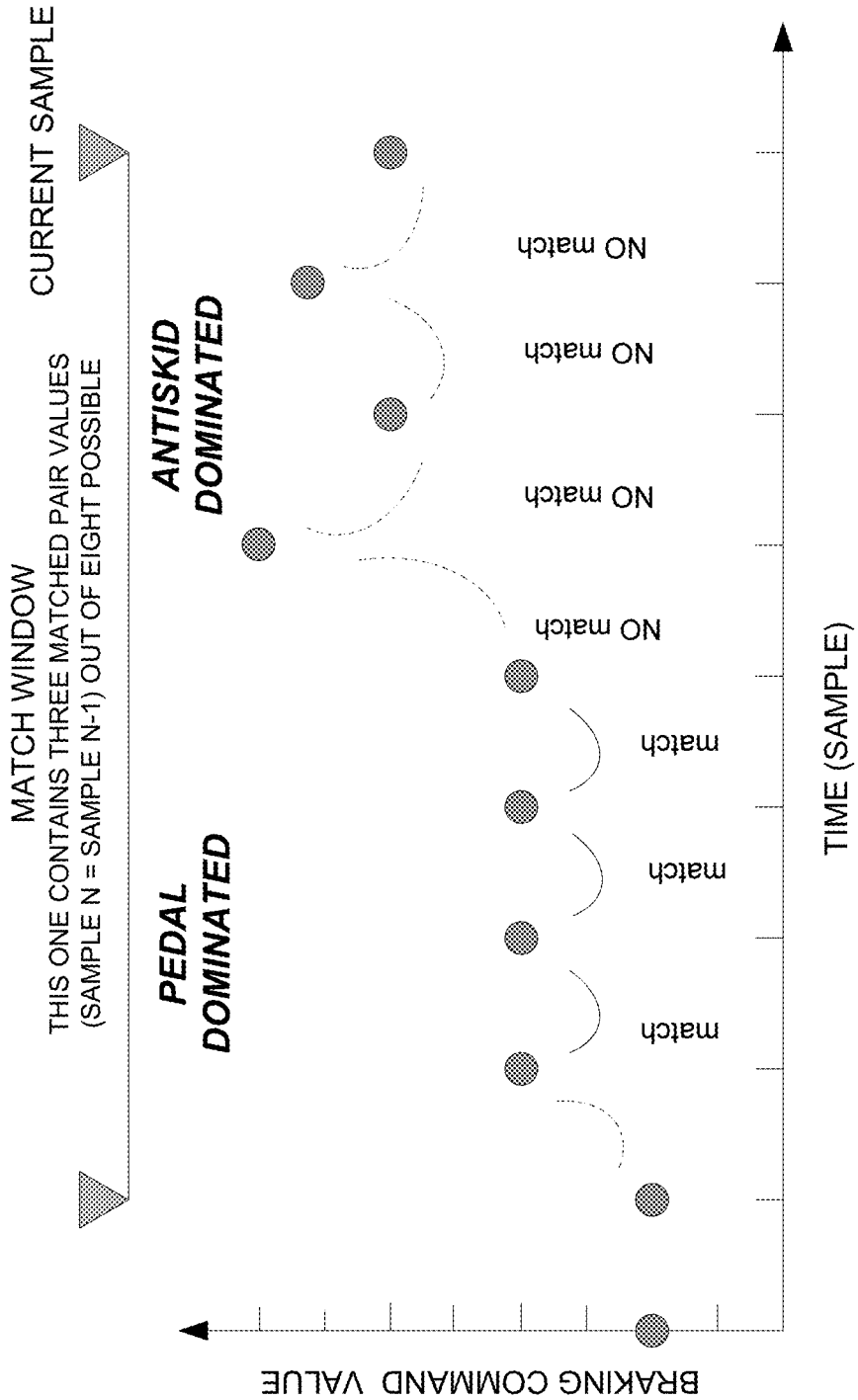
FIG. 7 is a graph showing the processing of a sequence of command value samples by a matched pair algorithm for predicting the system operating mode. In the example depicted in FIG. 7, the commands sampled during a first portion of a time window are predominantly brake pedal commands and the commands sampled during a second portion of the time window are predominantly anti-skid commands.

FIG. 7 is a graph showing the processing of a sequence of command value samples by a matched pair adaptation algorithm for predicting the system operating mode. In the example depicted in FIG. 7, the system is beginning to enter into anti-skid operation, meaning that the anti-skid release command value is approximately equal to the pedal braking command value. As seen in FIG. 7, the commands sampled during a first portion of the time window are predominantly brake pedal commands and the commands sampled during a second portion of the time window are predominantly anti-skid commands. Since the anti-skid command contains high spectral energy, it is unlikely to contain many matched pairs, unless the command values equal zero corresponding to full brake release, which is treated as a special case (i.e., instead of 0 meaning 0% braking force applied, 0 values cause the brake actuators to be pulled off some distance from the brake). In the time window shown in FIG. 7, there are three matched pairs out of eight possible; therefore the filter coefficients should be adjusted to represent a fast-response filter, to provide good anti-skid response. If a certain threshold is exceeded, the filter can be bypassed in its entirety if necessary.

The filter coefficient adjustments can be made using any one of several methods known in the art (e.g., Kalman filtering), or via a simple table look-up, in which the count of matched pairs in the time window function determines the filter coefficients. The transition to direct (i.e., pass-through) mode occurs at some low threshold value of the match count.

Figure 8:
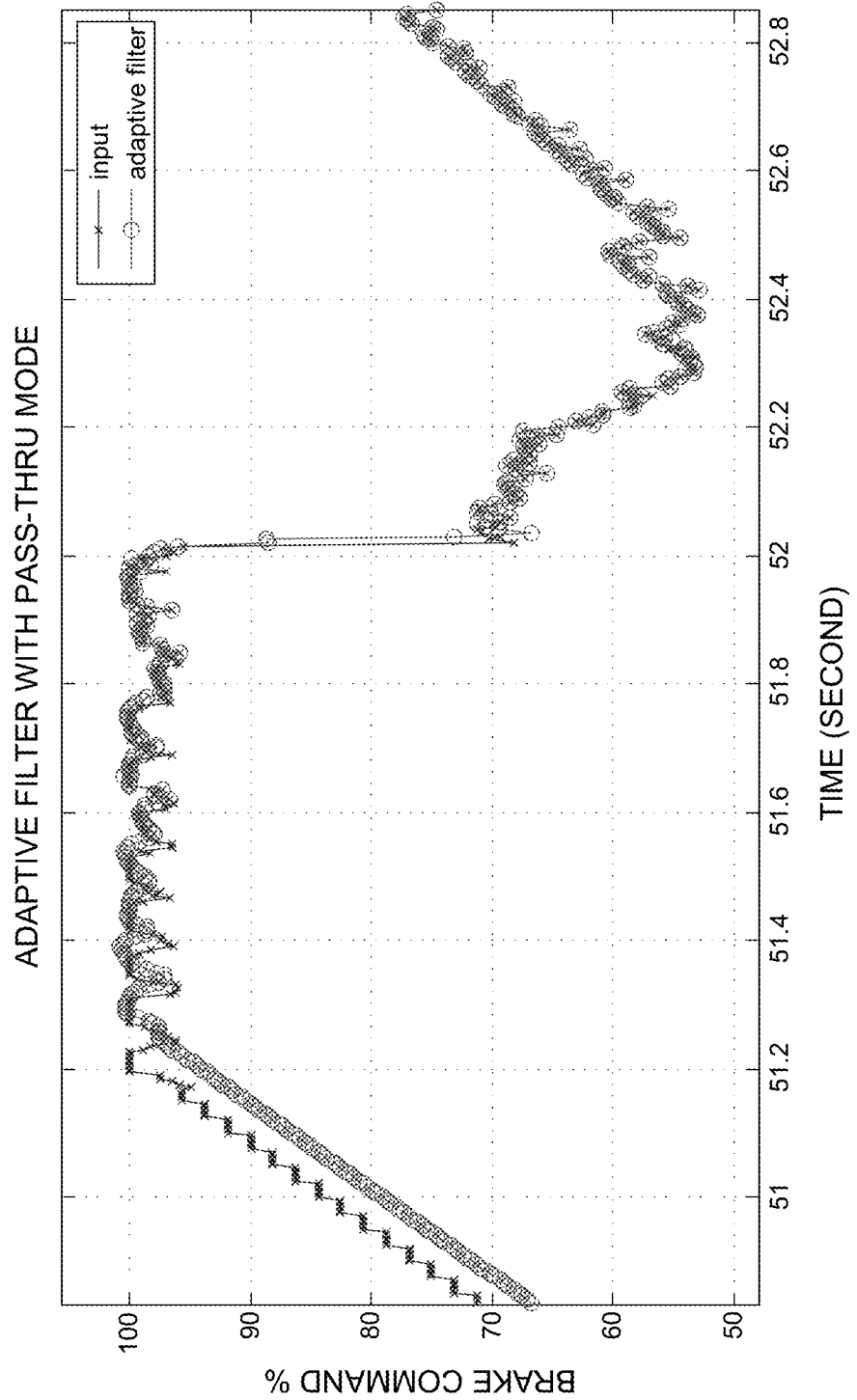
FIG. 8 is another graph of brake command (%) versus time (seconds) for an adaptive filter with pass-through mode. The x's represent the input to the adaptive filter; the circles represent the output of the adaptive filter.

FIG. 8 is a graph of brake command (%) versus time (seconds) representing a sequence of sampled commands. This graph demonstrates the performance of the adaptive filter 10 depicted in FIG. 5. In the sequence of command samples shown in FIG. 8, the unfiltered output is the series of x's, while the filtered output is indicated by circles. This graph shows an initially smoothly rising pedal brake command, which in this case happens to be updated at a 25-millisecond rate, resulting in the stair-step behavior seen from t=50.5 seconds to t=51 seconds. After this time, the brake command is at 100%, and then a small anti-skid input begins to appear. During this time, the filter coefficients have been adjusted to provide a faster filter response, so the chain of circles more nearly tracks the input (i.e., the chain of x's). At t=52 seconds, however, a large initial skid occurs, which results in a brake release command due to anti-skid operation to about 70%. At this point the digital filter has, within one or two samples, converted into the direct pass-through mode. Subsequent anti-skid commands dominate the signal as they are less than the 100% pedal command, and so the signal contains high-frequency content, and the filter is then operating either in a pass-through mode or in a fast response mode, and thus accurately tracks the anti-skid command. Note that braking performance during an anti-skid operation is critical and methods to switch between the slow response mode and the fast response or pass-through mode can be done so that the adaptive filter quickly changes to pass-through or fast response mode once a small number of mismatched samples have occurred. The adaptive filter can also stay in that mode until a large number of matched samples occur over a long period of time. In this way it can be "slow" to get into slow response mode and "fast" to get into pass-through or fast response mode once the anti-skid function is active. Whether the mode of the adaptive filter is pass-through or fast response depends on respective specified thresholds for the numbers of matched pairs, the threshold for the pass-through mode being less than the threshold for the fast response mode.

Figure 9:
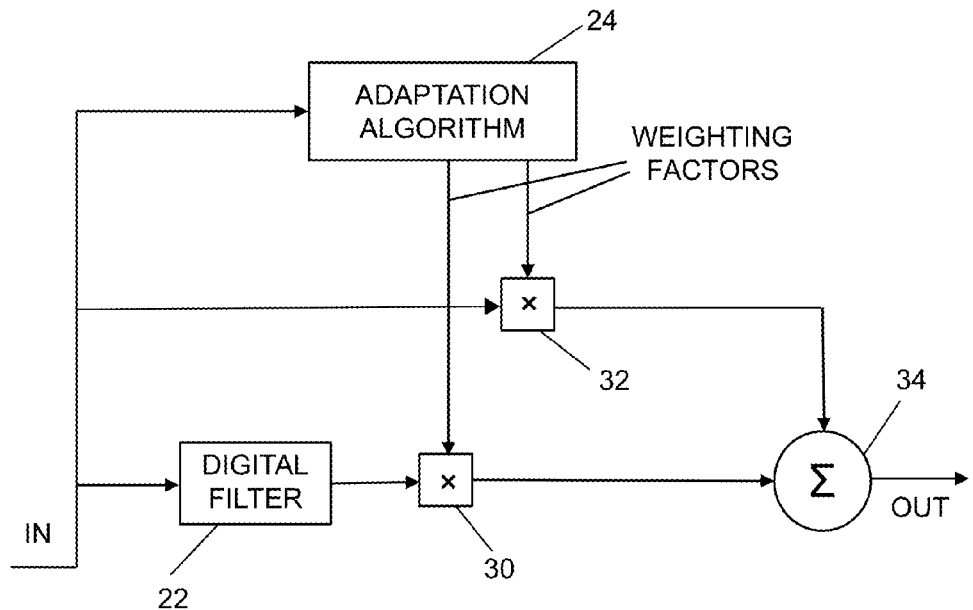
FIG. 9 is a block diagram showing components of an improved wheel braking control system having an adaptive filter that forms weighted sums of filtered and unfiltered braking commands in accordance with another embodiment.

In accordance with an alternative embodiment depicted at a high level in FIG. 9, an adaptation algorithm 24 can be provided which forms a weighted sum of the unfiltered and filtered braking command values, wherein the weighting factors are a function of the number of matched pair values in the time window. The weighting factors are input to a first multiplier 30, which also receives the filter braking command from the digital filter 22, and to a second multiplier 32, which also receives the unfiltered braking command. The respective product output by multipliers 30 and 32 are then summed in summing junction 34. A simple implementation of this concept is switching from the filtered to the unfiltered signal based upon the number of matches, in which case the weighting factors input to multipliers 30 and 32 by the adaptation algorithm 24 would change from 1 and 0 to 0 and 1 respectively.

In those embodiments wherein the adaptation algorithm 24 forms a weighted sum of the unfiltered and filtered braking command values, the filter coefficients used by digital filter 22 are fixed (i.e., not changed), but what is changed is the weighting factors used to form the weighted sum of the unfiltered input and a slow filtered version thereof. This is algorithmically simpler and easier to demonstrate stability, but will not provide as smooth of a transition as methods involving filter coefficient adjustment. Note that the digital filter 22 could also be configured to adapt if desired.

A further alternative embodiment (depicted at a high level in FIG. 10) relates to the case where there is a signal (i.e., "anti-skid command in FIG. 10) available from the brake control unit which indicates when the anti-skid command exceeds the pedal command. There is thus no need to count matched pairs of values to determine when the system should have a fast response. In that case, it is still important to smoothly transition between a filtered mode of operation and the unfiltered mode. There should be an adjustment of the filter coefficients used by digital filter 22 along a trajectory so that the signal transitions into or out of filtered command smoothly. Therefore, the adaptation algorithm 24 instead performs a step-by-step adjustment of the filter coefficients based on the time which has elapsed since the change of mode from anti-skid to non-anti-skid operation or vice versa. At the end of this step-by-step adjustment of the filter coefficients, the adaptation algorithm issues a multiplexer control signal which causes the multiplexer 26 to output the unfiltered braking command instead of the filtered braking command output by the digital filter 22.

Digital filters, such as the second-order IIR filter partly depicted in FIG. 4, are well known in the art. The concept of adjusting filter coefficients per some optimizing target is the basis of adaptive filter theory and is also well known in the art. The methodologies disclosed above utilize a digital filter to provide the following enhanced features.

(1) The signature of repeating unfiltered braking command values received within a time window can serve as an indicator of the required system frequency response (i.e., the matched pair value adaptation algorithm described above).

(2) A digital filter with adjustable filter coefficients can be employed, wherein the filter coefficients are adjusted based on the content of anti-skid command contained in the unfiltered merged braking command.

(3) In the alternative, a digital filter with fixed filter coefficients can be used, wherein a weighted sum of the filtered and unfiltered braking commands is adjusted based on a weighting which comes from a predictor function of the anti-skid content of the braking command.

(4) A digital filter can be employed which has a separate input that indicates the anti-skid content of the braking command, and uses a time-based adaptation algorithm to gradually adjust the digital filter coefficients.

(5) A fixed-frequency response filter can be employed which has a separate input that indicates the anti-skid content of the braking command, and uses a time-based adaptation algorithm to gradually adjust the weighted sum of the filtered and unfiltered braking commands.

(6) The matched pair adaptation algorithm can be used in a rate-sensitive manner such that the rate of transition to the fast-response (anti-skid) mode is rapid, but the transition into the slow-response mode is slow.

The braking control function described above includes the pilot input, along with inputs from an automatic wheel-based brake control system, generically referred to as the "autobrake". Many other braking control input functions can exist in both driven wheel systems such as automobiles and in non-driven wheel vehicles such as aircraft. For aircraft systems, additional control inputs could include a hydroplane and locked wheel protection function as well as "taxi brake release", which is a wear reduction function.

While methods and means for reducing wear in electric or electro-hydraulic braking systems utilizing an adaptive digital filter have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used herein, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

The method claims set forth hereinafter should not be construed to require that the steps recited therein be performed in alphabetical order (alphabetical ordering in the claims is used solely for the purpose of referencing previously recited steps) or in the order in which they are recited. Nor should they be construed to exclude two or more steps or portions thereof being performed concurrently or to exclude any portions of two or more steps being performed alternatingly.

Figure 10:
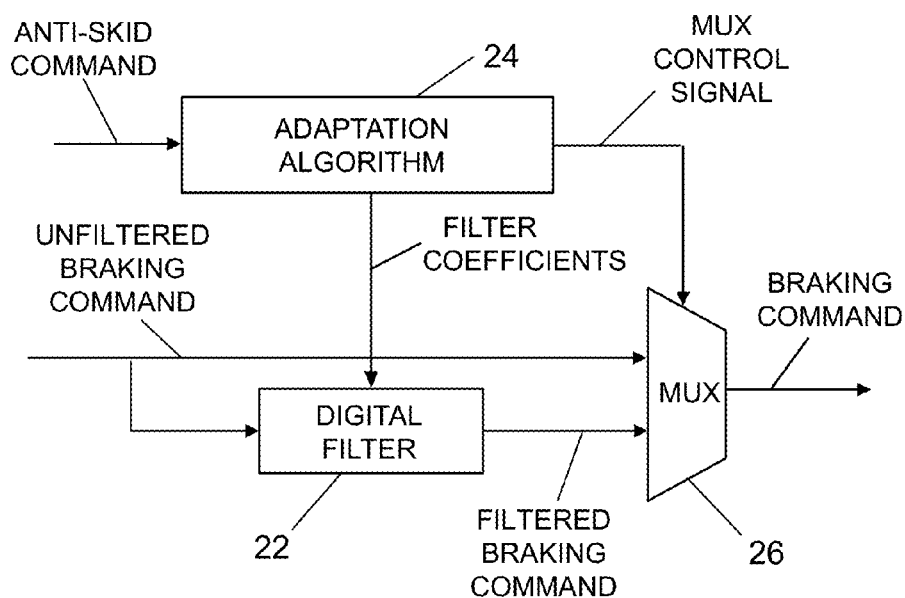
FIG. 10 is a block diagram showing components of an improved wheel braking control system having an adaptive filter for filtering braking commands in accordance with a further embodiment.

The structures corresponding to the "adaptive filtering means" recited in the claims include the structures shown in FIGS. 5, 9 and 10 (and described in the specification) and equivalents thereof. The structures corresponding to the "means for communicating a signal" recited in the claims include an electrically conductive wire, a wireless channel, and equivalents thereof. The structures corresponding to the "means for forming a weighted sum" recited in the claims include the multipliers and summer shown in FIG. 9 and equivalents thereof.

The invention claimed is:

1. A method for braking comprising:
   (a) receiving a sequence of unfiltered braking command values comprising brake command values that are merged with anti-skid command values;
   (b) adaptively filtering said sequence of unfiltered braking command values to form filtered braking command values; and
   (c) controlling a brake in accordance with said filtered braking command values,
   wherein said adaptive filtering changes from a first mode to a second mode in response to a content of anti-skid command values exceeding a first specified threshold.

2. The method as recited in claim 1, wherein said second mode is a pass-through mode.

3. The method as recited in claim 1, wherein said second mode is a fast response mode.

4. The method as recited in claim 1, wherein step (b) comprises:
   selecting a first set of filter coefficients in response to a transition in said sequence of unfiltered braking command values from predominantly brake command values to predominantly anti-skid command values;
   configuring a filter with said first set of selected filter coefficients; and
   filtering subsequently received unfiltered braking command values using the filter configured with said first set of selected filter coefficients.

5. The method as recited in claim 4, wherein step (b) further comprises:
   determining a signature of braking command values of said sequence of unfiltered braking command values received within a time window; and
   determining whether said signature is indicative of said transition.

6. The method as recited in claim 5, wherein said signature comprises a number of matched pairs of braking command values of said sequence of unfiltered braking command values received within said time window, and said step of determining whether said signature is indicative of said transition comprises determining whether said number of matched pairs of braking command values is less than a second specified threshold.

7. The method as recited in claim 4, wherein step (b) further comprises:
   selecting a second set of filter coefficients in response to a transition in said sequence of unfiltered braking command values from predominantly anti-skid command values to predominantly brake command values;
   configuring the filter with said second set of selected filter coefficients; and
   filtering subsequently received unfiltered braking command values using the filter configured with said second set of selected filter coefficients.

8. The method as recited in claim 7, wherein the filter is in a fast response mode when configured with said first set of selected filter coefficients and in a slow response mode when configured with said second set of current filter coefficients, and a rate of transition from said slow response mode to said fast response mode is greater than a rate of transition from said fast response mode to said slow response mode.

9. The method as recited in claim 7, wherein said filtering using said first set of selected filter coefficients and said filtering using said second set of selected filter coefficients are performed at respective predetermined time intervals subsequent to said transition, said respective predetermined time intervals being selected to ensure a smooth transition from a slow response filter mode to a fast response filter mode.

10. The method as recited in claim 1, wherein said brake command values are computed based on brake pedal commands.

11. The method as recited in claim 1, wherein said brake command values are computed based on autobrake commands.

12. The method as recited in claim 1, wherein step (b) comprises:
   determining a signature of braking command values of said sequence received within a time window;
   determining whether said signature is indicative of a transition in said sequence of unfiltered braking command values from predominantly brake command values to brake command values less than a second specified threshold; and
   filtering subsequently received unfiltered braking command values using a filter when said signature is not indicative of said transition and passing through said subsequently received unfiltered braking command values without filtering when said signature is indicative of said transition.

13. The method as recited in claim 12, wherein said signature comprises a number of matched pairs of braking command values of said sequence of unfiltered braking command values received within said time window, and said step of determining whether said signature is indicative of said transition comprises determining whether said number of matched pairs of braking command values is less than the second specified threshold.

14. A method for braking comprising:
(a) receiving a sequence of unfiltered braking command values comprising brake command values that are merged with anti-skid command values;
(b) determining a signature of braking command values of said sequence of unfiltered braking command values received within a time window;
(c) filtering received unfiltered braking command values to form filtered braking command values;
(d) forming a weighted sum of said filtered and unfiltered braking command values using weighting factors which are a function of said signature of braking command values of said sequence of unfiltered braking command values received within a time window; and
(e) controlling a brake in accordance with said weighted sum.

15. The method as recited in claim 14, wherein said signature comprises a number of matched pairs of braking command values of said sequence of unfiltered braking command values received within said time window, and said step of determining whether said signature is indicative of said transition comprises determining whether said number of matched pairs of braking command values is less than a specified threshold.

16. A method for braking comprising:
(a) receiving a sequence of unfiltered braking command values comprising brake command values that are merged with anti-skid command values;
(b) receiving a signal indicative of a transition from a brake command mode to an anti-skid command mode;
(c) adaptively filtering said sequence of unfiltered braking command values to form filtered braking command values; and
(d) controlling a brake in accordance with said filtered braking command values,
wherein said adaptive filtering gradually changes modes from a first mode to a second mode over time in response to receipt of said signal indicative of a transition from a brake command mode to an anti-skid command mode.

17. The method as recited in claim 16, wherein said first mode is a slow response mode and said second mode is a pass-through mode.

18. A braking system comprising:
a brake arranged for braking a wheel;
an actuator controller coupled to said brake;
a braking command source of a sequence of braking command values comprising brake command values that are merged with anti-skid command values; and
adaptive filtering means for adaptively filtering said sequence of braking command values, said adaptive filtering means having an input coupled to said braking command source and an output coupled to said actuator controller,
wherein said adaptive filtering means changes modes from a slow response mode to a different mode in response to receipt of information indicating that a content of anti-skid command values in said braking command values exceeds a specified threshold.

19. The braking system as recited in claim 18, wherein said different mode is a pass-through mode.

20. The braking system as recited in claim 18, wherein said different mode is a fast response mode.

21. The braking system as recited in claim 18, wherein said adaptive filtering means comprise a filter and an adaptation algorithm each connected to receive said sequence of braking command values, wherein said adaptation algorithm reconfigures said filter in response to the content of anti-skid command values in said sequence of braking command values exceeding said specified threshold.

22. The braking system as recited in claim 18, wherein said adaptive filtering means comprise a filter connected to receive said sequence of braking command values, means for forming a weighted sum of the input to and output from said filter, and an adaptation algorithm connected to receive an anti-skid command, wherein said adaptation algorithm determines weighting factors to be applied by said means for forming a weighted sum in response to the content of anti-skid command values in said sequence of braking command values exceeding said specified threshold.

23. The braking system as recited in claim 18, further comprising means for communicating a signal indicative of a transition from a brake command mode to an anti-skid command mode, wherein said adaptive filtering means has a first input coupled to said means for communicating a signal, a second input coupled to said braking command source, and an output coupled to said actuator controller, and said adaptive filtering means gradually changes modes from said slow response mode to a different mode over time in response to said signal indicative of a transition from a brake command mode to an anti-skid command mode.

24. The braking system as recited in claim 23, wherein said different mode is a pass-through mode.

* * * * *